United States Patent
Zhou et al.

(10) Patent No.: US 11,057,604 B2
(45) Date of Patent: Jul. 6, 2021

(54) IMAGE PROCESSING METHOD AND DEVICE

(71) Applicant: SZ DJI TECHNOLOGY CO., LTD., Shenzhen (CN)

(72) Inventors: You Zhou, Shenzhen (CN); Jiexi Du, Shenzhen (CN); Hualiang Feng, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/822,937

(22) Filed: Mar. 18, 2020

(65) Prior Publication Data

US 2020/0221062 A1    Jul. 9, 2020

Related U.S. Application Data

(63) Continuation of application No. PCT/CN2017/103630, filed on Sep. 27, 2017.

(51) Int. Cl.
*H04N 13/128*    (2018.01)
*H04N 13/271*    (2018.01)
*H04N 13/00*     (2018.01)

(52) U.S. Cl.
CPC ......... *H04N 13/128* (2018.05); *H04N 13/271* (2018.05); *H04N 2013/0081* (2013.01)

(58) Field of Classification Search
CPC .............................. G06T 7/593; H04N 13/128
See application file for complete search history.

(56) References Cited

U.S. PATENT DOCUMENTS 6,556,704 B1 * 4/2003 Chen .................. G06K 9/20
                                                    382/154
8,878,842 B2 * 11/2014 Kim ................... H04N 13/271
                                                    345/419
(Continued)

FOREIGN PATENT DOCUMENTS

CN    102203829 A    9/2011
CN    103049933 A    4/2013
(Continued)

OTHER PUBLICATIONS

The World Intellectual Property Organization (WIPO) International Search Report for PCT/CN2017/103630 dated Jun. 15, 2018 5 pages.

*Primary Examiner* — Peter D Le
(74) *Attorney, Agent, or Firm* — Anova Law Group, PLLC

(57) ABSTRACT

An image processing device acquires at least two first images and at least two second images, where a resolution of the at least two first images is a first resolution, a resolution of the at least two second images is a second resolution, and the second resolution is lower than the first resolution. By using the at least two first images and the at least two second images, the image processing device respectively determines a first depth map corresponding to the at least two first images under a limit of a first disparity threshold, and a second depth map corresponding to the at least two second images under a limit of a second disparity threshold, where the second disparity threshold is greater than the first disparity threshold. The image processing device then combines the determined first depth map with the second depth map to generate a combined depth map.

18 Claims, 9 Drawing Sheets

(56) References Cited

U.S. PATENT DOCUMENTS

| | | | | |
|---|---|---|---|---|
| 9,230,330 | B2* | 1/2016 | Luo | G06T 7/593 |
| 9,886,769 | B1* | 2/2018 | Tremaine | G06F 3/017 |
| 2004/0105074 | A1* | 6/2004 | Soliz | G06T 7/593 |
| | | | | 351/206 |
| 2004/0252862 | A1* | 12/2004 | Camus | G06K 9/00805 |
| | | | | 382/104 |
| 2009/0060280 | A1* | 3/2009 | Choi | G06T 7/593 |
| | | | | 382/106 |
| 2011/0128394 | A1* | 6/2011 | Narayanan | H04N 5/345 |
| | | | | 348/222.1 |
| 2012/0249750 | A1* | 10/2012 | Izzat | H04N 13/144 |
| | | | | 348/47 |
| 2013/0050187 | A1* | 2/2013 | Korcsok | H04N 13/111 |
| | | | | 345/419 |
| 2013/0077852 | A1* | 3/2013 | Chang | G06T 7/593 |
| | | | | 382/154 |
| 2014/0029836 | A1* | 1/2014 | Keselman | H04N 13/139 |
| | | | | 382/154 |
| 2014/0111623 | A1* | 4/2014 | Zhao | H04N 13/128 |
| | | | | 348/47 |
| 2014/0198977 | A1* | 7/2014 | Narasimha | G06T 5/007 |
| | | | | 382/154 |
| 2014/0267243 | A1* | 9/2014 | Venkataraman | H04N 13/106 |
| | | | | 345/419 |
| 2015/0022632 | A1 | 1/2015 | Appia | |
| 2015/0049169 | A1* | 2/2015 | Krig | H04N 13/211 |
| | | | | 348/46 |
| 2015/0085082 | A1* | 3/2015 | Zierke | H04N 13/282 |
| | | | | 348/48 |
| 2015/0178936 | A1* | 6/2015 | Boisson | H04N 13/271 |
| | | | | 382/154 |
| 2015/0237329 | A1* | 8/2015 | Venkataraman | G06T 7/285 |
| | | | | 348/48 |
| 2015/0281676 | A1* | 10/2015 | Koehle | H04N 13/254 |
| | | | | 348/49 |
| 2015/0304634 | A1* | 10/2015 | Karvounis | G06T 7/277 |
| | | | | 348/46 |
| 2016/0012567 | A1* | 1/2016 | Siddiqui | G06T 3/4007 |
| | | | | 382/154 |
| 2016/0037152 | A1* | 2/2016 | Kim | G06T 7/557 |
| | | | | 348/47 |
| 2016/0182893 | A1 | 6/2016 | Wan | |
| 2016/0275691 | A1* | 9/2016 | Domanski | G06K 9/6201 |
| 2017/0186171 | A1* | 6/2017 | Hsieh | G06T 7/593 |
| 2017/0272727 | A1* | 9/2017 | Jiang | H04N 13/271 |
| 2017/0366795 | A1* | 12/2017 | Chou | H04N 13/128 |
| 2018/0137637 | A1* | 5/2018 | Cho | G06T 7/521 |
| 2018/0225866 | A1* | 8/2018 | Zhang | G06T 7/593 |
| 2018/0240247 | A1* | 8/2018 | Cutu | G06T 5/002 |

FOREIGN PATENT DOCUMENTS

| | | |
|---|---|---|
| CN | 103139469 A | 6/2013 |
| CN | 104519343 A | 4/2015 |

\* cited by examiner

IMAGE PROCESSING METHOD AND DEVICE

CROSS-REFERENCE TO RELATED APPLICATION

The present disclosure is a continuation of International Application No. PCT/CN2017/103630, filed Sep. 27, 2017, the entire content of which is incorporated herein by reference.

TECHNICAL FIELD

The present disclosure relates to the field of image processing technology and, more particularly, to a method and device for image processing.

BACKGROUND

With the development of computer technology, as an important field of intelligent computing, computer vision has been greatly developed and applied. Computer vision relies on imaging systems instead of visual organs as input sensitive means. Among these imaging systems, cameras are the most commonly used ones. For example, a dual vision camera may be used to form a basic vision system.

Currently, a corresponding depth map may be generated by using a binocular camera system through two images taken by two cameras at two different angles at the same time.

In the actual process of calculating a depth map, the depth map is usually calculated within a certain search region to reduce the calculation. However, for high-resolution images, this process causes nearby objects to be unrecognizable. If the search region is broadened, the amount of calculation will be extremely large. For low-resolution images, limiting the search region will result in a low observation accuracy, especially for observation of the distant objects.

SUMMARY

In accordance with the present disclosure, there is provided an image processing device. The image processing device includes a memory and a processor. The processor is configured to acquire at least two first images, where a resolution of the at least two first images is a first resolution. The processor also acquires at least two second images, where a resolution of the at least two second images is a second resolution, where the second resolution is lower than the first resolution. By using the at least two first images, the processor determines a first depth map corresponding to the at least two first images under a limit of a first disparity threshold. By using the at least two second images, the processor further determines a second depth map corresponding to the at least two second images under a limit of a second disparity threshold, where the second disparity threshold is greater than the first disparity threshold. The determined first depth map and the second depth map are then combined by the processor to generate a combined depth map.

DETAILED DESCRIPTION OF THE EMBODIMENTS

To make the objective, technical solutions, and advantages of the present disclosure clearer, the technical solutions of the embodiments of the present disclosure will be made in detail hereinafter with reference to the accompanying drawings of the disclosed embodiments. Apparently, the disclosed embodiments are merely some, but not all, of the embodiments of the present disclosure. Various other embodiments obtained by a person of ordinary skills in the art based on the embodiments of the present disclosure without creative efforts still fall within the protection scope of the present disclosure.

Unless otherwise stated, all technical and scientific terms used in the examples of the present disclosure have the same meanings as commonly understood by those skilled in the relevant art of the present disclosure. The terms used in the present disclosure are merely for the purpose of describing specific embodiments, and are not intended to limit the scope of the present disclosure.

Computer vision relies on imaging systems instead of visual organs as input sensitive means. Among these imaging systems, cameras are the most commonly used ones. For example, a dual vision camera may be used to form a basic vision system.

A corresponding depth map may be generated by taking pictures from different angles at the same time using two cameras of a binocular camera system. The binocular camera system may be a front-view binocular camera system, a rear-view binocular camera system, a left-view binocular camera system, or a right-view binocular camera system.

In the actual process of calculating a depth map, a matching calculation may be performed based on two images taken by two cameras at the same time, and the depth information of each pixel in the images is calculated.

Optionally, a depth of a pixel may be calculated by using the following Equation (1):

$$d = f \frac{b}{d_p} \quad (1)$$

where d is the depth, b is the distance between the left and right cameras, f is the focal length of the cameras, and $d_p$ is the disparity.

As can be seen from the above Equation (1), since b and f are physical properties and generally remain unchanged, d is inversely proportional to $d_p$. For a nearby object, the depth is smaller and the disparity is larger, while for a distant object, the depth is larger while the corresponding disparity is smaller.

An example regarding how to calculate a depth will be described hereinafter with reference to FIG. 1.

Figure 1:
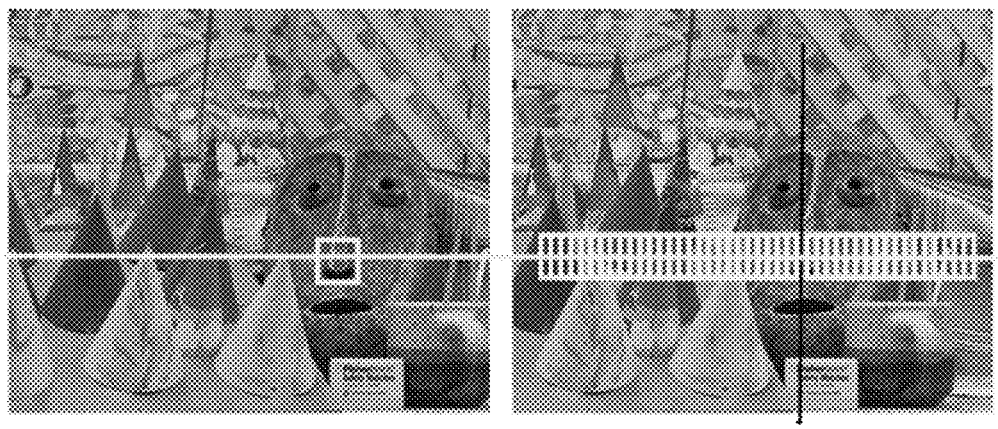
FIG. 1 illustrates a schematic diagram of a method for depth calculation according to an embodiment of the present disclosure.

As shown in FIG. 1, a pixel, in the right image, that matches a pixel in the left image is to be located. That is, search and traverse on a straight line in the right image to find a pixel that matches the pixel in the left image, i.e., a pixel with the highest match score values in the right image. A disparity between the pixel in the left image and the matching pixel in the right image is then calculated.

It is to be understood that FIG. 1 only shows a single match. In the actual process, the pixels in an image may be searched one by one. In addition, in FIG. 1, only a local matching is conducted. In the actual process, after the matching, optimization and adjustment may be further performed, to eventually calculate a disparity for a pixel between the left and right images.

For example, as shown in FIG. 1, a pixel on the nasal tip of a mask is located at row 20, column 100 in the left image. After the left and right images are rectified, theoretically, the pixel on the nasal tip in the right image should be located also on row 20 but the column position should be <100. Accordingly, by searching from right to left starting from the pixel at row 20, column 100, a pixel at row 20, column 80 in the right image that matches the pixel on the nasal tip in the left mage may be eventually determined. The disparity of the determined pixel is |80−100|=20.

As can be seen from the above, for a high-resolution image, it takes a long time to perform matching calculations if each pixel on each row of the image is calculated. Therefore, in the actual calculations, a search region may be limited. For instance, a search is limited to a maximum of 64 disparities on an image with a resolution of 320*240. That is, each pixel in the left image just needs to be searched 64 times in the right image. Accordingly, by limiting the maximum search region, the calculation time required for the matching calculations will be reduced, thereby lowering the consumption of the computing resources.

However, for a high-resolution image, for example, for an image with a resolution of 640*480, if a search is still limited to a maximum of 64 disparities, it will cause nearby objects to be unrecognizable, that is, a large dead zone will appear. If the search region is broadened, the required amount of calculation will be quite large.

For a low-resolution image, for example, for an image with a resolution of 320*240, limiting a search to a maximum of 64 disparities will result in lower observation accuracy for distant objects. This can be seen from Equation (1). For a distant object, that is, an object with a small disparity, e.g., a disparity of only 2, a disparity error of ±0.5 will make the calculated depth greatly deviate from the actual depth. However, for a nearby object, e.g., an object with a disparity of 30, a ±0.5 disparity error will not make the calculated depth greatly deviate from the actual depth.

From the above analysis, it can be seen that, for a nearby object, if the search is limited to a maximum of 64 disparities for an image with a resolution of 320*240, then for an image with a resolution of 640*480, the search needs to be limited to a maximum of 128 disparities. This will lead to a skyrocketing of the required computing resources. For a distant object, for an image with a resolution of 640*480, if the search is limited to a maximum of 2 disparities, then for an image with a resolution of 320*240, the search needs to be limited to a maximum of 1 disparity, which then results in a really low observation accuracy.

To observe nearby objects more accurately and to observe distant objects with a higher observation accuracy, for images with a resolution of 640*480, the search needs to be limited to a maximum of 128 disparities, which requires a large amount of calculation. For an aircraft that has a high demand for real-time processing, this is quite challenging to achieve.

When an aircraft flies at a low altitude, the aircraft needs to avoid obstacles that are within a short distance. Meanwhile, a depth map calculated by using high-resolution images may not be helpful due to the large dead zones. On the other hand, when the aircraft is flying at a high speed, a high accuracy is required for the observation of distant objects. At this moment, a depth map calculated using low-resolution images cannot meet this requirement. Under certain circumstances, low-resolution images may be used to calculate a depth map, but this requires an aircraft to limit its flight speed.

For the above reasons, the embodiments of the present disclosure provide an image processing solution, which acquires more accurate depth information by combining depth maps generated from high- and low-resolution images, and does not require a large amount of calculation.

Figure 2:
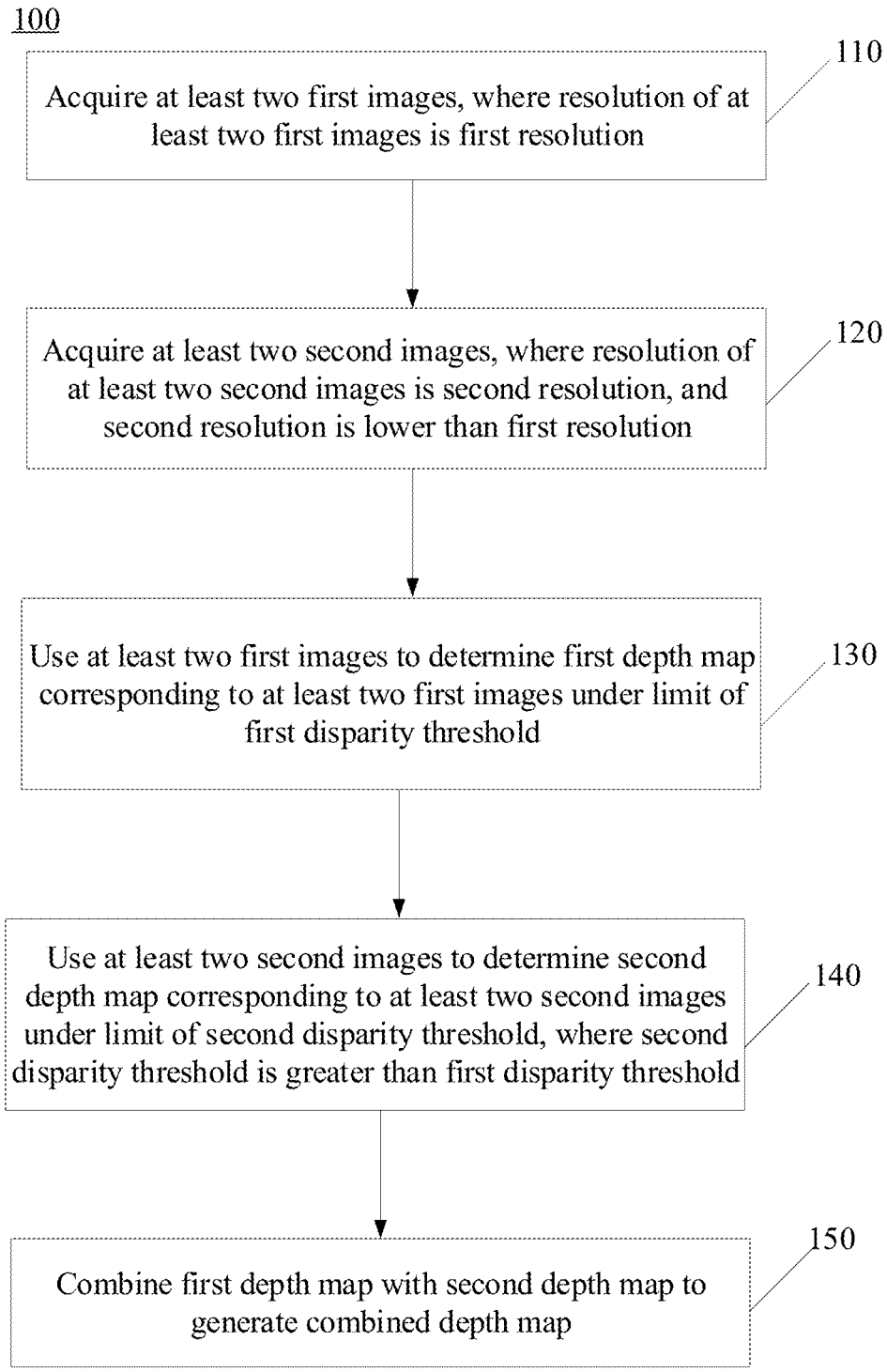
FIG. 2 illustrates a flowchart of a method for image processing according to an embodiment of the present disclosure.

FIG. 2 is a flowchart of an image processing method 100 according to an embodiment of the present disclosure. The method 100 includes at least a part of the following description.

Step 110: Acquire at least two first images, where a resolution of the at least two first images is a first resolution.

Optionally, the at least two first images may originate from a binocular camera. For example, the at least two first images may be images taken by a binocular camera at the same time, or may be images down-sampled from the images taken by the binocular camera at the same time.

It is to be understood that the at least two first images may not necessarily originate from a binocular camera. For example, the at least two first images may originate from a monocular or a multiocular (more than binocular) camera.

Step 120: Acquire at least two second images, where a resolution of the at least two second images is a second resolution, and the second resolution is lower than the first resolution.

Optionally, the at least two second images may be acquired by downsampling the at least two first images, respectively.

Optionally, the at least two first images and the at least two second images may be respectively generated by downsampling images with a higher resolution.

Step 130: Use the at least two first images to determine a first depth map corresponding to the at least two first images under the limit of a first disparity threshold.

Specifically, the first disparity threshold may be considered as a maximum search region. On a first image, a pixel matching a certain pixel in another first image is searched to find the disparity corresponding to that pixel, so as to get the depth for that pixel.

The value of the depth or depth information described in the embodiments of the present disclosure may be a depth d or a disparity in Equation (1). This is because the disparity has an inverse relationship with the depth d, and that the disparity directly reflects the depth.

Specifically, a depth map described in the embodiments of the present disclosure may directly include the depth d of each pixel or include the disparity corresponding to each pixel.

Step 140: Use the at least two second images to determine a second depth map corresponding to the at least two second images under a limit of a second disparity threshold, where the second disparity threshold is greater than the first disparity threshold.

Specifically, the second disparity threshold may be used as a maximum search region. On a second image, a pixel matching a certain pixel of another second image is searched, so as to find a disparity corresponding to that pixel, so as to get the depth for that pixel.

Step 150: Combine the first depth map and the second depth map to generate a combined depth map.

Optionally, the combination of the first depth map and the second depth map may use the following approach:

Use the depths of a first portion of pixels on the first depth map and the depths of a second portion of pixels on the second depth map to generate a combined depth map. Here, the first portion of pixels are pixels, on the first depth map, that match a third portion of pixels, where the third portion of pixels are the pixels other than the second portion of pixels on the second depth map.

Specifically, in the above approach, the depth information of one portion of pixels on the second depth map and the depth information of certain pixels, on the first depth map, that match the other portion of pixels on the second map may be used to generate a combined depth map.

It is to be understood that the combination of depth maps in the embodiments of the present disclosure is not limited to the above described approach. For instance, the depth information of a certain pixel on the first depth map and the depth information of a pixel on the second depth map that matches the certain pixel on the first map may be combined and processed (i.e., two depth information are combined, for example, through averaging or weighted processing, etc.) to acquire the depth information for that pixel.

Optionally, the disparities corresponding to the depths of the third portion of pixels described above are less than or equal to a third disparity threshold.

Specifically, because the second depth map calculated by using a low-resolution image and under the limit of a larger disparity threshold is less accurate for distant objects or people (i.e., their corresponding disparities are smaller), the depth information for the distant part may be replaced with the depth information of the matched pixels in the first depth map, so that the problem of low accuracy for the depth information for the distant part may be solved.

Optionally, the third disparity threshold is equal to a value obtained by dividing the first disparity threshold by a first value. Here, the first value is a pixel ratio of the first resolution to the second resolution in a first direction, where the first direction is a pixel scanning direction when acquiring the first depth map and the second depth map.

Optionally, if a depth map is acquired by scanning in rows, the first direction is a row direction. If a depth map is acquired by scanning in columns, the first direction is a column direction. Apparently, the scanning direction may also be other directions, which are not specifically limited in the embodiments of the present disclosure.

For example, if the resolution of the first images is 640*480, and the resolution of the second image s is 320*240, and the depth map is scanned in rows, then the first value may be 2.

Optionally, in the embodiments of the present disclosure, the depths of the second portion of pixels may be maintained on the second depth map. On the second depth map, the depths corresponding to values obtained by dividing the disparities corresponding to the depths of the first portion of pixels by the first value may be used to replace the depths of the third portion of pixels.

It is to be understood that, in addition to a value obtained by dividing the first disparity threshold value by the first value, the value for the third disparity threshold may also be other values, for example, a value smaller than that of the first disparity threshold divided by the first value.

It is to be understood that, in the foregoing descriptions, the depths of the third portion of pixels are replaced on the basis of the second depth map. However, under certain circumstances, the embodiments of the present disclosure may not necessarily change the depth information of some pixels on the basis of the second depth map, but rather re-record the depth information of the first portion of pixels and the depth information of the second portion of pixels on a new depth map.

To better understand the present disclosure, a method for calculating a depth map in the present disclosure will be described hereinafter by using the first images with a resolution of 640*480 and a first disparity threshold of 8 disparities and the second images with a resolution of 320*240 and a second disparity threshold of 64 disparities as an example.

Step 1: Calculate a depth map from at least two images with a low resolution. That is, a depth map is generated based on the images with a resolution of 320*240 and under a limit of 64 disparities.

Specifically, after the original images with a resolution of 640*480 are down-sampled to images with a resolution of 320*240, a depth map is then generated under a limit of 64 disparities.

Figure 3:
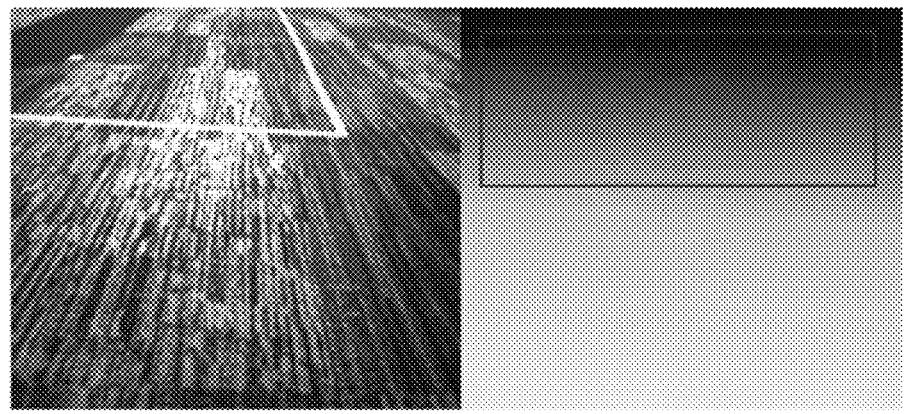
FIG. 3 illustrates a low-resolution image and a corresponding depth map according to an embodiment of the present disclosure.

For example, the left part in FIG. 3 is an image with a resolution of 320*240 (one of the at least two images), and the right part of FIG. 3 is the corresponding depth map calculated by the applicant. From the depth map in FIG. 3, it can be seen that the nearby ground is relatively smooth, but the distant ground has a clear stair-like structure. That is, the accuracy of the depth information calculated for the distant part is not really high.

Step 2: Use high-resolution images, but under a stricter limit of disparity threshold. That is, make a depth map based on images with a resolution of 640*480 and under a limit of 8 disparities. The purpose here is to calculate the points for the distant part.

Figure 4:
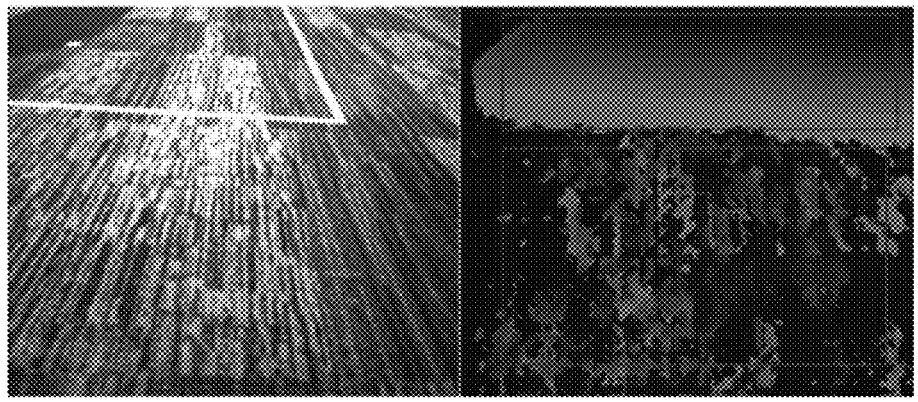
FIG. 4 illustrates a high-resolution image and a corresponding depth map according to an embodiment of the present disclosure.

For example, the left part in FIG. 4 is an image with a resolution of 640*480 (i.e., one of the at least two images). The right part of FIG. 4 is the corresponding depth map calculated by the applicant. A search with only 8 disparities is made on the high-resolution images. From the depth map shown in the right part of FIG. 4, it can be seen that although the nearby ground has some flaws, the distant ground is quite smooth.

Step 3: Combine the depth map generated from the high-resolution images and the depth map generated from the low-resolution images. That is, on the depth map generated from the low-resolution images, replace the disparities or depths for the points of less than 4 disparities with the disparities or depths of the corresponding points on the depth map generated from the high-resolution images.

That is, on the depth map generated from the low-resolution images, the points with a depth corresponding to a disparity greater than 4 are retained in the original calculation, but the depths of the points with a depth corresponding to a disparity less than or equal to 4 are replaced with the depths obtained by dividing the disparities of the matched pixels on the depth map corresponding to the high-resolution images by 2.

Figure 5:
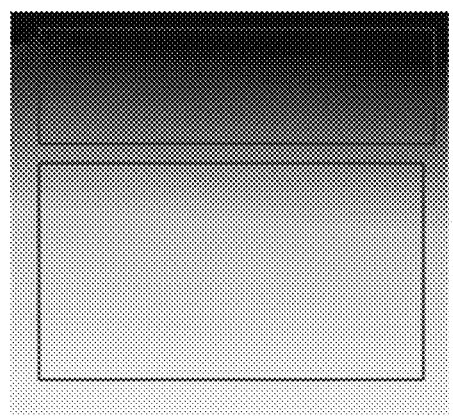
FIG. 5 illustrates a combined depth map according to an embodiment of the present disclosure.

For example, FIG. 5 illustrates a depth map generated after the depth maps in FIG. 3 and FIG. 4 are combined. The result here is close to a result obtained by the applicant by directly calculating the depths of the high-resolution images using 128 disparities.

It is to be understood that the darker the gray color in FIG. 3 to FIG. 5, the greater the depth. However, because only the grayscale diagram is used for illustration, the color shade in some places may not have a good correlation with the corresponding depths.

Optionally, in some embodiments of the present disclosure, when processing an image, for certain reasons (e.g., the processing capability and processing efficiency of the system), the image needs to be segmented or a to-be-processed region needs to be intercepted from the image. The segmented image block(s) or the intercepted region is then used to calculate the depth map.

To facilitate understanding, the following two implementations will be described in detail in combination. However, it is to be understood that the process of image segmentation or intercepting a to-be-processed region is not limited to these two implementations illustrated in the embodiments of the present disclosure. In addition, certain features of the following two implementations may be used in combination unless there are some clear conflicts.

Implementation I

Perform a segmentation processing on each first image of at least two first images to obtain segmented image blocks; combine image blocks with a same position on the at least two first images to obtain a plurality of image block groups; determine the depth map of each image block group in the plurality of image block groups under a limit of the first disparity threshold; join the depth maps of the plurality of image block groups together to obtain the first depth map.

Optionally, each first image may be segmented respectively according to the processing capability of the system (e.g., the maximum computing capability of the computing unit in the system).

Specifically, because the maximum computing capacity of the computing unit of the system is limited, if the resolution of an image is high and the size of the image is large, the calculation of the depth map may be very difficult to perform. Accordingly, a high-resolution image may be segmented, to allow each segmented image block to meet the maximum computing capacity of the computing unit.

Optionally, the image segmentation described in the embodiments of the present disclosure may be a uniform image segmentation. Apparently, the segmentation may not be necessarily always uniform. In one example, the segmentation is performed sequentially according to the maximum computing capacity of the computing unit until the last remaining image block that requires a computing capacity less than or equal to the maximum computing capacity of the computing unit.

Optionally, a plurality of computing units may perform a parallel processing on the obtained plurality of image block groups to acquire depth information corresponding to each image block group, thereby improving the image processing efficiency.

It is to be understood that although the above embodiment has been described in conjunction with the segmentation of the first images as an example, the embodiments of the present disclosure are not limited thereto. Although the resolution of the second images is lower than that of the first images, the second images may also be subjected to the segmentation processing (e.g., the computing capacity required for the second images is still greater than the maximum computing capacity of the computing unit in the system), and the segmented image block groups for the second images are used to calculate the depth map. The specific process for the second images may be similar to those described above for the first images. In other words, the second images may also be subjected to the segmentation processing.

Implementation II

On each of the at least two first images, a to-be-processed region is determined respectively; and the to-be-processed regions from the at least two first images are used to determine the first depth map under a limit of the first disparity threshold.

Optionally, the to-be-processed regions are determined according to the processing capability of the system.

Specifically, because the maximum computing capacity of the computing unit of the system is limited, if the resolution of an image is high and the size of the image is large, it will be very difficult to perform depth calculations. Accordingly, a to-be-processed region is obtained from each image according to the maximum computing capacity of the computing unit of the system.

Optionally, an expected moving position of a movable object is estimated, and the to-be-processed regions in the first images are determined according to the expected moving position of the movable object.

Optionally, the movable object may be an aircraft, an auto-driving car, or the like.

Optionally, the at least two first images are obtained by photo-shooting by a photographing device mounted on the movable object. The current speed of a reference object in the photographing device coordinate system is obtained and used to estimate the expected moving position of the movable object.

Optionally, the current speed of the movable object is used to estimate the current speed of the reference object in the photographing device coordinate system.

For example, the current moving speed of the movable object may be obtained through an inertial measurement unit installed on the movable object, so as to estimate the current speed of the reference object in the photographing device coordinate system.

Optionally, the current speed of the reference object in the photographing device coordinate system is estimated by using the moving trajectory of the movable object.

For example, the previously moved positions of the movable object may be obtained first. In the next, the points of the moved positions are projected into the photographing device coordinate system. The speed of the reference object in the photographing device coordinate system is then calculated based on the position change of the points in a series of captured image frames.

Optionally, the reference object may be a reference object that is stationary with respect to the earth, or a reference object that is moving with respect to the earth. Optionally, the reference object may be an obstacle that needs to be avoided by the moveable object.

Optionally, according to the speed of the reference object at time A in the photographing device coordinate system, a position P of the center G of the reference object in the photographing device coordinate system at time B (time B is after time A) may be estimated. The position P is projected to an image captured by the photographing device at time A, and is recorded as p. A to-be-processed region centered around p and having a specified region size is then determined.

Specifically, an expected moving position in the image may be estimated according to the speed of the reference object in the photographing device coordinate system. Since $[v_x^c, v_y^c, v_z^c]$ is known, and the focal length f of the camera is also known, according to a similar triangle relationship, Equation (2) may be:

$$\begin{cases} \Delta u = f \frac{v_x^c}{v_z^c} \\ \Delta v = f \frac{v_y^c}{v_z^c} \end{cases} \quad (2)$$

Figure 6:
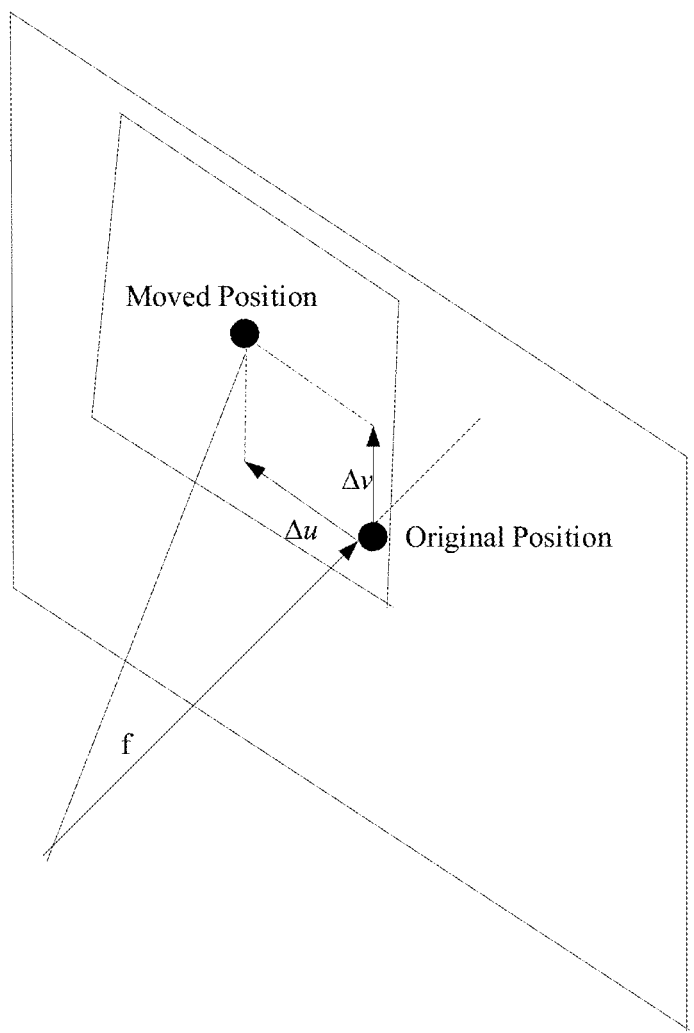
FIG. 6 illustrates a schematic diagram of a position for a to-be-processed region in an image according to an embodiment of the present disclosure.
Figure 7:
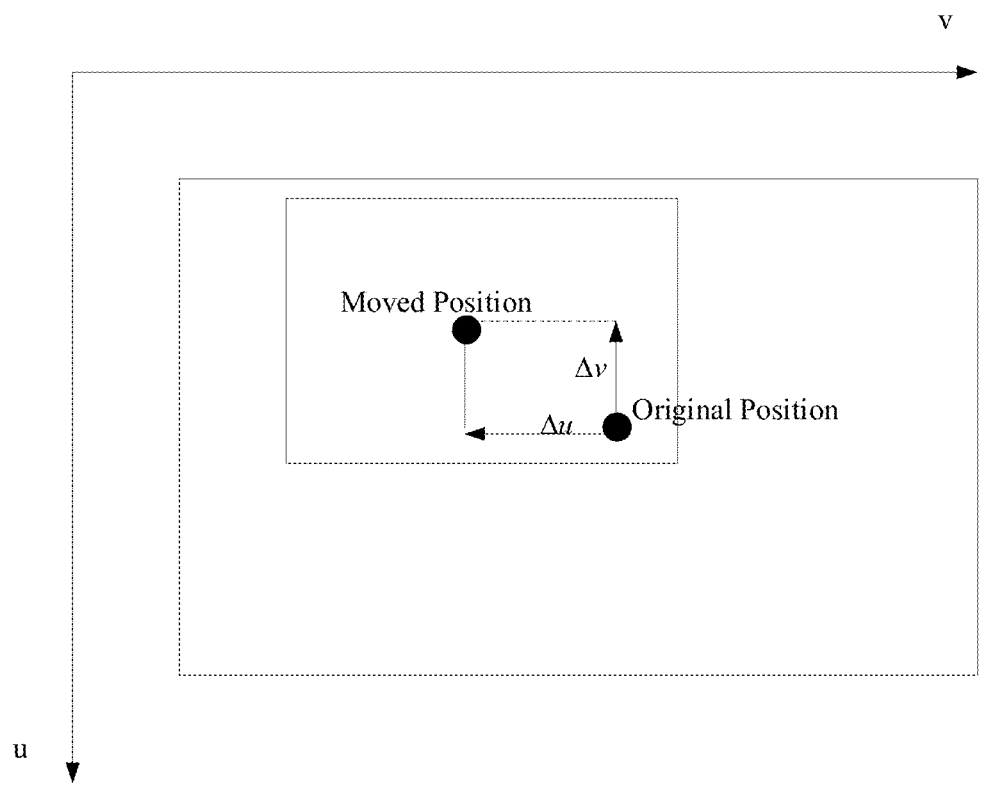
FIG. 7 illustrates a schematic diagram of a position for a to-be-processed region in an image according to another embodiment of the present disclosure.

With the offset $[\Delta u, \Delta v]^T$, and based on the optical axis coordinate $[u_0, v_0]^T$ (the original center point) of the first image given by the calibration parameters, the center $[u_0+\Delta u, v_0+\Delta v]^T$ of the to-be-processed region may be calculated. Next, according to the specified region size, by using $[u_0+\Delta u, v_0+\Delta y]^T$ as the center point, an image with the specified region size is then intercepted. For more details, refer to FIG. 6 and FIG. 7.

Figure 8:
FIG. 8 illustrates a schematic diagram of a position for a to-be-processed region in an image according to yet another embodiment of the present disclosure.

In one implementation, if the region matching the expected moving position exceeds a first image, the region matching the expected moving position is modified to obtain a to-be-processed region having the specified region size on the first image. For example, a to-be-processed region is shown in FIG. 8. In the figure, the black-filled region is the to-be-processed region, and the larger rectangular frame is the region of the first image.

Figure 9:
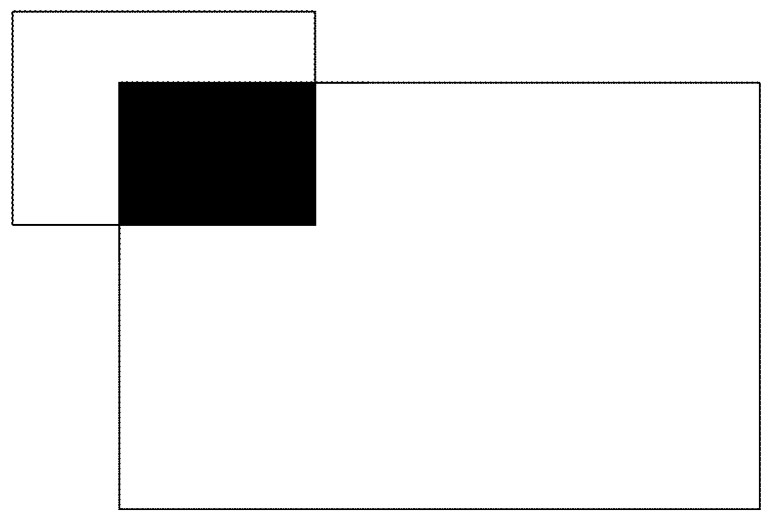
FIG. 9 illustrates a schematic diagram of a position for a to-be-processed region in an image according to yet another embodiment of the present disclosure.

In another implementation, if the region matching the expected moving position exceeds a first image, a sub-region, that does not exceed the first image, within the region matching the expected moving position is determined as the to-be-processed region. For example, a to-be-processed region is shown in FIG. 9. In the figure, the black-filled region is the to-be-processed region, and the larger rectangular frame is the region of the first image.

Optionally, the specified region size is determined according to the processing capability of the system. For example, the specified region size is equal to the maximum computing capacity of the computing unit of the system.

It is to be understood that although the foregoing embodiments are described by taking a to-be-processed region selected from a first image as an example, the embodiments of the present disclosure are not limited thereto. Although the resolution of the second images is lower than that of the first images, a to-be-processed region may also be selected from a second image (e.g., the computing capacity required by a second image is still greater than the maximum computing capacity of the computing unit), and the depth map is calculated based on the to-be-processed region on the second image. The specific process may be similar to the above description with respect to the first images. In other words, the second images may also be intercepted.

Optionally, in the embodiments of the present disclosure, an image group may be selected from a plurality of image groups according to a moving direction of the movable object, where the selected image group includes at least two first images.

Specifically, the movable object may have a plurality of photographing systems, and images that need to perform depth information combination may be selected according to the moving direction of the movable object.

For example, assuming that the movable object needs to move forward, a group of images captured by a front-view camera may be selected. The selected group of images may be used to generate depth maps corresponding to the high- and low-resolution images, and then the depth information of the corresponding depth maps may be combined.

For example, assuming that the movable object needs to move in the front left direction, a group of images taken by a front-view camera and a group of images taken by a left-view camera may be then selected. Depth maps corresponding to the respective high- and low-resolution images are respectively generated by using the two groups of images. Accordingly, the depth maps are respectively generated for the two groups of images, which are then respectively combined.

Optionally, the depth maps in the embodiments of the present disclosure may be used to avoid obstacles.

Optionally, the combined depth map in the embodiments of the present disclosure may be combined with another non-combined depth map to avoid obstacles.

Specifically, at least two third images are acquired, and the third images have the second resolution (i.e., the low resolution). Use the at least two third images to determine a third depth map corresponding to the third images under a limit of the second disparity threshold. The third depth map and the combined depth map are used to avoid obstacles.

The third images may not be in the moving direction of the movable object, for example, a direction opposite to the moving direction of the movable object.

For example, assuming that the movable object needs to move forward, a group of images taken by a front-view camera may be selected. The selected group of images are used to generate depth maps corresponding to the high- and low-resolution images. The depth information on the depth maps are then combined to avoid the obstacles ahead. A group of images taken by a rear-view camera may also be selected, and the low-resolution images are used to generate a depth map under a limit of a large disparity threshold, to avoid obstacles in the back.

For example, assuming that the movable object needs to move in the front left direction, a group of images taken by a front-view camera and a group of images taken by a left-view camera may be selected, and used to generate depth maps corresponding to the respective high- and low-resolution images of the two groups of images. The depth maps respectively generated from the two groups of images are then combined, to avoid obstacles in the front left direction of movement. Meanwhile, a group of images taken by a rear-view camera are selected, and the low-resolution images and a large disparity threshold limit are used to generate a depth map, to avoid obstacles in the back. A group of images taken by a right-view camera are selected, and low-resolution images and a large disparity threshold limit are used to generate a depth map, to avoid obstacles on the right.

To facilitate understanding, the following description will be made based on two specific embodiments in combination with an aircraft in a specific scenario. It is to be understood that the two specific embodiments described below are only for the convenience of the reader to understand the present disclosure, and should not be constructed as limiting the present disclosure.

Background information for the following two embodiments: Original images obtained by the sensor(s) during the actual process are high-resolution images, that is, a resolution of 1280*800 (WXGA, or 800p). To ensure that the depth information is able to be used as control feedback, it may be optimal to have a certain calculation frequency of the depth map (e.g., 10 Hz (i.e., 10 frames per second, frame interval 100 ms)). However, due to the limitation of the computing resources on an aircraft, the computing unit supports images with a maximum resolution of 640*480 (VGA). In addition, a maximum of 6 groups of images may be calculated in 100 ms.

Embodiment 1 (Avoid Front and Rear Obstacles)

Step 1: First, down-sample two groups of high-resolution WXGA images, taken by the front-view and rear-view cameras, to VGA images to obtain two groups of low-resolution images.

Figure 10:
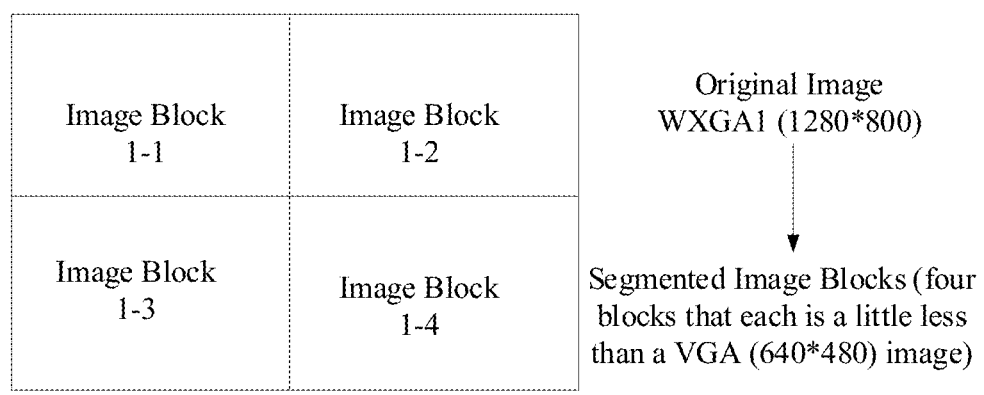
FIG. 10 illustrates a schematic diagram of an image block segmentation processing of a high-resolution image according to an embodiment of the present disclosure.
Figure 11:
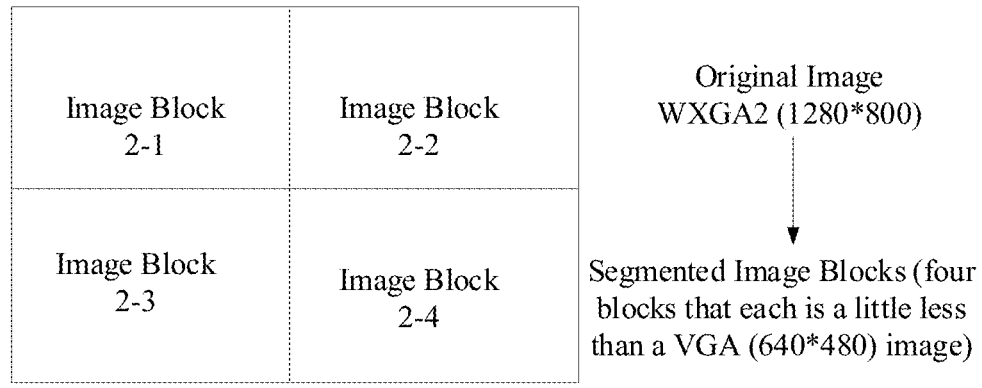
FIG. 11 illustrates a schematic diagram of an image block segmentation processing of a high-resolution image according to another embodiment of the present disclosure.

Step 2: According to the direction of flight, select a front-view image group (when flying forward) or a rear-view image group (when flying backward), and segment each WXGA image included in the selected image groups into four pieces, each of which is slightly smaller than a VGA image. Accordingly, four images are obtained for each WXGA image. Here, each WXGA image is segmented but not down-sampled. Actually, it may be considered that each WXGA image is divided into 4 calculations for 4 depth maps, which are then joined together to form a depth map for the WXGA image. Therefore, this step is equivalent to calculating depth maps for high-resolution images, and thus a stricter limit of disparity threshold should be selected. Among the segmented images, image blocks in the same position may form an image block group. For example, as shown in FIG. 10 and FIG. 11, WXGA1 and WXGA2 are segmented, respectively. Image block 1-1 and image block 2-1 form an image block group, image block 1-2 and image block 2-2 for an image block group, image block 1-3 and image block 2-3 form an image block group, and image block 1-4 and image block 2-4 form an image block group.

Step 3: The two image groups in Step 1 and the four image block groups in Step 2 (exactly six image groups or the image block groups in total) are each calculated for its respective depth map by the computing unit. Next, a depth map calculated from a VGA image downsampled from a high-resolution WXGA image in Step 1 is used as the basis map, which is then combined with the depth map calculated from the group of four small segmented image blocks to get a more accurate depth map.

Embodiment 2 (Avoid Obstacles in all Directions)

Step 1: Down-sample the four groups of high-resolution WXGA images taken from the front, back, left, and right sides to VGA images, to get 4 groups of low-resolution images.

Step 2: According to the direction of flight, select a first image group of front-view images (taken from a forward, front left, or front right flight) or rear-view images (taken from a backward, rear left, or rear right flight), and select a second group of left-view images (taken form a left, front left, or rear left flight) or right-view images (taken from a right, front right or rear right), to get two groups of high-resolution WXGA images. Next, predict the flight trajectory of the movable object based on the flight speed. According to the flight trajectory or direction, select a VGA image for each image of the first image group to form a first image block group, and select a VGA image for each image of the second image group to form a second image block group.

Step 3. For the four image groups selected in Step 1 and the two image block groups in Step 2, calculate their respective depth maps through the computing unit. Take the two depth maps calculated based on VGA images down-sampled from the two groups of high-resolution WXGA images (the direction of the view of the maps selected here is the same as the direction of the view of the maps in Step 2) as the basis maps, and combine them (may be combined in each direction) with the respective depth maps generated from the two image block groups in Step 2, so as to get more accurate depth maps.

In the embodiments of the present disclosure, for high-resolution images, a smaller disparity threshold is used for the depth map calculations, and for low-resolution images, a larger disparity threshold is used for the depth map calculations. The depth map generated based on the high-resolution images and the depth map generated based on the low-resolution images are combined. Accordingly, the problem of a large dead zone of a depth map calculated based on a high image resolution and a small disparity threshold (the selection of such calculation simply for the reason to save the calculation) may be solved by the depth information calculated based on a low image resolution and a large disparity threshold. Meanwhile, the problem of low accuracy of depth information for a distant part calculated with a low image resolution and a large disparity threshold may be solved by the depth information calculated based on a high image resolution and a small disparity threshold. Accordingly, the image processing method of the embodiments of the present disclosure acquires more accurate depth information by combining the depth maps generated from high- and low-resolution images, which does not require a large amount of calculation (e.g., due to the use of depth maps based on low-resolution images), and can also solve the problem of necessary flight speed limit in order to avoid obstacles by an aircraft.

Figure 12:
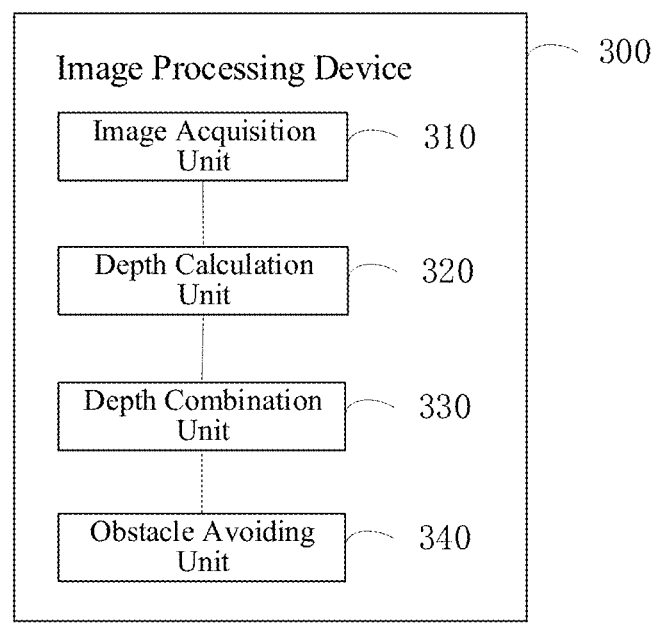
FIG. 12 illustrates a schematic block diagram of an image processing device according to an embodiment of the present disclosure.

FIG. 12 is a schematic block diagram of an image processing advice according to an embodiment of the present disclosure. As shown in FIG. 12, the device includes an image acquisition unit 310, a depth calculation unit 320, and a depth combination unit 330.

The image acquisition unit 310 is configured to: acquire at least two first images, where a resolution of the first images is a first resolution; and acquire at least two second images, where a resolution of the second images is a second resolution, and the second resolution is lower than the first resolution.

The depth calculation unit 320 is configured to: use the at least two first images to determine a first depth map corresponding to the at least two first images under a limit of a first disparity threshold; and use the at least two second images to determine a second depth map corresponding to the at least two second images under a limit of a second disparity threshold, where the second disparity threshold is greater than the first disparity threshold.

The depth combination unit 330 is configured to combine the first depth map and the second depth map to generate a combined depth map.

Optionally, the deep combination unit 330 is further configured to: combine the depths of a first portion of pixels on the first depth map and the depths of a second portion of pixels on the second depth map to generate the combined depth map. Here, the first portion of pixels are the pixels, on the first depth map, that match a third portion of pixels, where the third portion of pixels are the pixels other than the second portion of pixels on the second depth map.

Optionally, disparities corresponding to the depths of the third portion of pixels are less than or equal to a third disparity threshold.

Optionally, the third disparity threshold is equal to a value obtained by dividing the first disparity threshold by a first value, where the first value is a pixel ratio of the first resolution to the second resolution in a first direction, where the first direction is a pixel scanning direction when the first depth map and the second depth map are acquired.

Optionally, the deep combination unit 330 is further configured to: maintain the depths of the second portion of pixels on the second depth map; and replace the depths of the third portion of pixels on the second depth map with depths corresponding to values obtained by dividing the disparities corresponding to the depths of the first portion of pixels by the first value.

Optionally, the depth calculation unit 320 is further configured to: perform a segmentation processing in each of the at least two first images to obtain segmented image blocks; combining at least two image blocks having a same position on the first images to obtain a plurality image block groups; determine a depth map of each image block group in the plurality of image block groups under a limit of the first disparity threshold; and join the depth maps of the plurality of image block groups together to generate the first depth map.

Optionally, the depth calculation unit 320 is further configured to segment each of the first images respectively according to the processing capability of the system.

Optionally, the depth calculation unit 320 is further configured to: determine a to-be-processed region on each of the at least two first images, respectively; and use the to-be-processed regions of the at least two first images to determine the first depth map under a limit of the first disparity threshold.

Optionally, the depth calculation unit 320 is further configured to determine a to-be-processed region according to the processing capacity of the system.

Optionally, the depth calculation unit 320 is further configured to: estimate the expected moving position of a movable object; and determine the to-be-processed region on the first images according to the expected moving position.

Optionally, the depth calculation unit 320 is further configured to: take the expected moving position as the center and determining a region matching the expected moving position on the first image according to a specified region size; and when the region matching the expected moving position exceeds the first image, the region matching the expected moving position is modified to obtain a to-be-processed region having the specified region size on the first image.

Optionally, the depth calculation unit 320 is further configured to: take the expected moving position as the center and determine a region matching the expected moving position on the first image according to the specified region size; and when the region matching the expected moving position exceeds the first image, a sub-region, within the region matching the expected moving position, that does not exceed the first image is determined as the to-be-processed region.

Optionally, the depth calculation unit 320 is further configured to determine the specified region size according to the processing capacity of the system.

Optionally, the at least two first images are obtained by a photographing device on the movable object; and the depth calculation unit 320 is further configured to: obtain the current speed of a reference object in the photographing device coordinate system; estimate the expected moving position according to the current position of the reference object in the photographing device coordinate system.

Optionally, the depth calculation unit 320 is further configured to: use the current moving speed of the movable object to estimate the current speed of the reference object in the photographing device coordinate system; or, use the already moved positions of the movable object to estimate the current speed of the reference object in the photographing device coordinate system.

Optionally, the processing capacity of the system is the maximum computing capacity of the computing unit of the system.

Optionally, the image acquisition unit 310 is further configured to: acquire at least two third images, where the third images have a second resolution; and the depth calculation unit 320 is further configured to use the at least two third images to determine a third depth map corresponding to the third images under a limit of the second disparity threshold. As shown in FIG. 12, the image processing device further includes an obstacle avoiding unit 340 that is configured to use the third depth map and the combined depth map to avoid obstacles.

Optionally, the image acquisition unit 310 is further configured to down-sample the at least two first images to obtain the at least two second images.

Optionally, the image acquisition unit 310 is further configured to select an image group from a plurality of image groups according to a moving direction of the movable object, where the selected image group includes the at least two first images.

It is to be understood that the image processing device 300 may execute the solutions and steps described in the method 100. For brevity, the related details are not described herein again.

Figure 13:
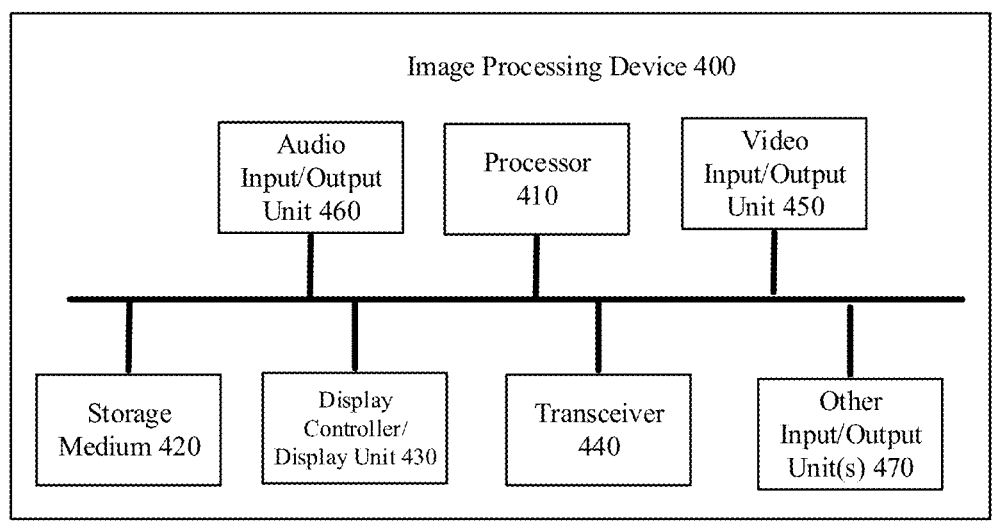
FIG. 13 illustrates a schematic block diagram of an image processing device according to another embodiment of the present disclosure.

FIG. 13 is a schematic block diagram of an image processing device 400 according to another embodiment of the present disclosure.

Optionally, the image processing device 400 may include a plurality of different components, which may be integrated circuits (ICs), or parts of integrated circuits, discrete electronic devices, or other circuit board (such as motherboard or add-on board)-compatible modules that may server as an integrated part of a computer system.

Optionally, the image processing device may include a processor 410 and a storage medium 420 coupled to the processor 410.

The processor 410 may include one or more general-purpose processors, such as a central processing unit (CPU), or a processing device. Specifically, the processor 410 may be a complex instruction set computing (CISC) microprocessor, a very long instruction word (VLIW) microprocessor, and a microprocessor for implementing a plurality of instruction set combinations. The processor may also be one or more special-purpose processors, such as application specific integrated circuits (ASICs), field programmable gate arrays (FPGAs), digital signal processors (DSPs).

The processor 410 may communicate with the storage medium 420. The storage medium 420 may be a magnetic disk, an optical disk, a read only memory (ROM), a flash memory, or a phase change memory. The storage medium 420 may store instructions stored by the processor, and/or may cache some information stored from an external storage device, for example, layered pixel information of an image of a pyramid read from an external storage device.

Optionally, in addition to the processor 410 and the storage medium 420, the image processing device may further include a display controller/display unit 430, a transceiver 440, a video input/output unit 450, an audio input/output unit 460, and other input/output units 470. These components included in the image processing device 400 may be interconnected through a bus or an internal connection.

Optionally, the transceiver 440 may be a wired transceiver or a wireless transceiver, such as a WIFI transceiver, a satellite transceiver, a Bluetooth transceiver, a wireless cellular phone transceiver, or a combination thereof.

Optionally, the video input/output unit 450 may include an image processing subsystem, such as a camera. The image processing subsystem may include a light sensor, a charged coupled device (CCD), or a complementary metal-oxide semiconductor (CMOS) light sensor for photo-shooting functions.

Optionally, the audio input/output unit 460 may include a speaker, a microphone, a headphone, and the like.

Optionally, the other input/output devices 470 may include a storage device, a universal serial bus (USB) port, a serial port, a parallel port, a printer, a network interface, and the like.

Optionally, the image processing device 400 may perform the operations shown in the method 100. For brevity, the related details are not described herein again.

Optionally, the image processing device 300 or 400 may be located on a moving device. The moving device may move in any suitable environment, for example, in the air (e.g., a fixed-wing aircraft, a rotorcraft, or an aircraft with neither a fixed-wing nor a rotor), in the water (e.g., a ship or a submarine), on land (e.g., car or train), space (e.g., space plane, satellite, or space probe), and any combination of the above environments. The moving device may be an aircraft, such as an unmanned aerial vehicle (UAV). In some embodiments, the moving device may carry a live subject, such as a human or an animal.

Figure 14:
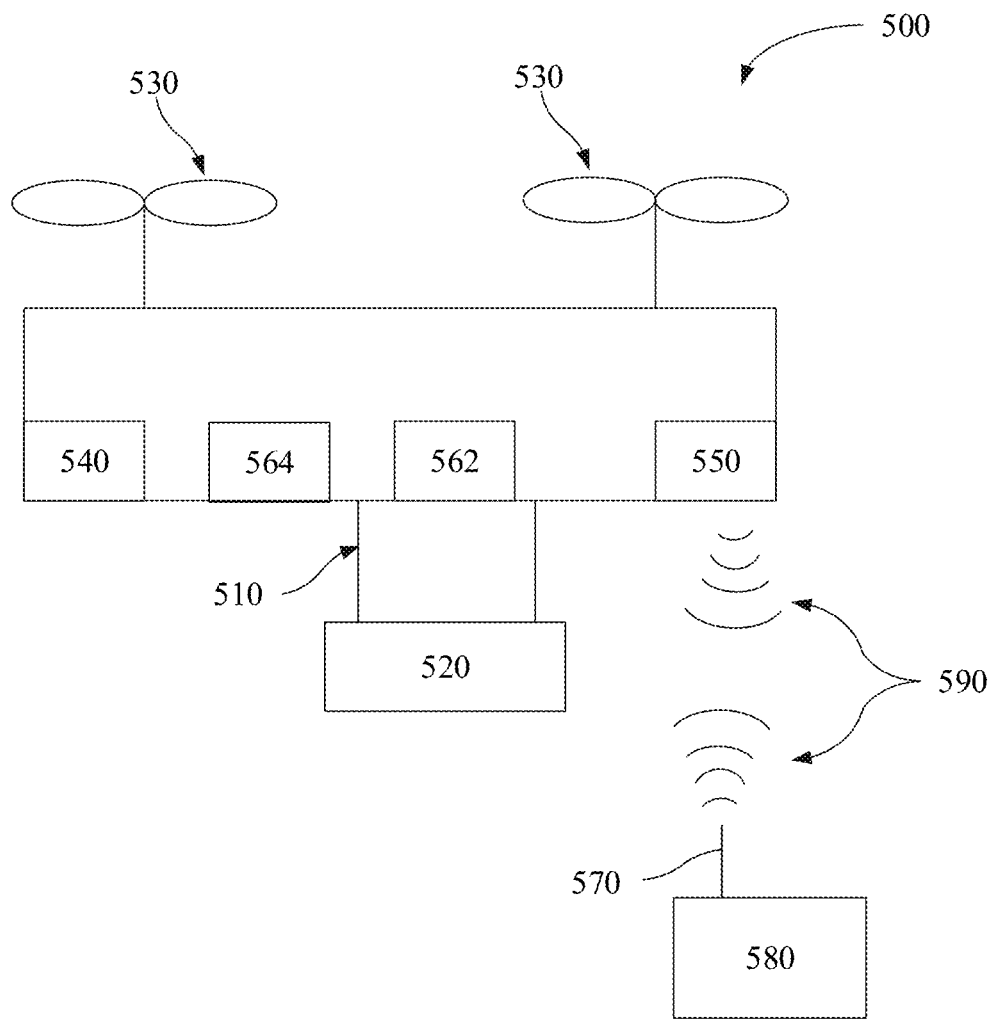
FIG. 14 illustrates a schematic block diagram of an unmanned aerial vehicle according to an embodiment of the present disclosure.

FIG. 14 is a schematic block diagram of a moving device 500 according to an embodiment of the present disclosure. As shown in FIG. 14, the moving device 500 includes a carrier 510 and a load 520. The description of the moving device as a UAV in FIG. 14 is for illustrative purposes only. The load 520 may be connected to the moving device without being through the carrier 510. The movable device 500 may further include a propulsion system 530, a sensing system 540, a communication system 550, an image processing device 562, and a photographing system 564.

The propulsion system 530 may include an electronic speed controller (may also be referred to as ESC), one or more propellers, and one or more electric motors coupled to the one or more propellers. The motors and the propellers are disposed on the corresponding arms. The ESC is configured to receive a driving signal generated by a flight controller and provide a driving current to the motors according to the driving signal, to control the rotation speed and/or steering of the motors. The motors are configured to drive the propellers to rotate, so as to provide propulsion for the UAV flight. The propulsion allows the UAV to achieve one or more degrees of freedom of movement. In some embodiments, the UAV may be rotated around one or more rotational axes. For example, the rotational axes may include a roll axis, a yaw axis, and a pitch axis. It is to be understood that a motor may be a DC motor or an AC motor. In addition, a motor may be a brushless motor or a brushed motor.

The sensing system 540 is configured to measure the attitude information of the UAV, that is, the position information and status information of the UAV in space, such as three-dimensional position, three-dimensional angle, three-dimensional velocity, three-dimensional acceleration, and three-dimensional angular velocity. The sensing system may include sensors, for example, at least one of a gyroscope, an electronic compass, an inertial measurement unit ("IMU"), a vision sensor, a global positioning system ("GPS"), and a barometer. The flight controller is configured to control the UAV flight. For example, the UAV flight may be controlled according to the attitude information measured by the sensing system. It is to be understood that the flight controller may control the UAV according to a pre-programmed program instruction, and may also control the UAV by responding to one or more control instructions from the control device.

The communication system 550 may communicate with a terminal device 580 having a communication system 570 through a wireless signal 590. The communication system 550 and the communication system 570 may include a plurality of transmitters, receivers, and/or transceivers for wireless communication. The wireless communication here may be a one-way communication. For example, only the moving device 500 may send data to the terminal device 580. Alternatively, the wireless communication may also be a two-way communication, through which the data may be sent from the moving device 500 to the terminal device 580, or from the terminal device 580 to the moving device 500.

Optionally, the terminal device 580 may provide control data for one or more of the moving device 500, the carrier 510, and the load 520, and may receive information sent by the moving device 500, the carrier 510, and the load 520. The control data provided by the terminal device 580 may be used to control the state of the one or more of the moving device 500, the carrier 510, and the load 520. Optionally, the carrier 510 and the load 520 include a communication module for communicating with the terminal device 580.

It is to be understood that the image processing device 660 included in the moving device shown in FIG. 14 may execute the method 100. For brevity, the related details are not described herein again.

The foregoing descriptions are merely specific implementations of the present disclosure, but the protection scope of the present disclosure is not limited thereto. Any person skilled in the art may easily derive other variations or substitutions within the technical scope disclosed in the present disclosure, all of which shall fall within the protection scope of the present disclosure. Accordingly, the protection scope of the present disclosure shall be subject to the protection scope of the appended claims.

What is claimed is:

1. An image processing device, comprising:
   a memory for storing program instructions; and
   a processor coupled to the memory to recall the program instructions that, when executed by the processor, cause the processor to perform operations including:
   acquiring at least two first images, wherein a resolution of the at least two first images is a first resolution;
   acquiring at least two second images, wherein a resolution of the at least two second images is a second resolution, and the second resolution is lower than the first resolution;
   using the at least two first images to determine a first depth map corresponding to the at least two first images under a limit of a first disparity threshold;
   using the at least two second images to determine a second depth map corresponding to the at least two second images under a limit of a second disparity threshold, wherein the second disparity threshold is greater than the first disparity threshold; and
   combining the first depth map with the second depth map to generate a combined depth map, including using depths of a first portion of pixels on the first depth map and depths of a second portion of pixels on the second depth map to generate the combined depth map, wherein the first portion of pixels are pixels on the first depth map that match a third portion of pixels, and the third portion of pixels are pixels other than the second portion of pixels on the second depth map.

2. The image processing device according to claim 1, wherein disparities corresponding to depths of the third portion of pixels are less than or equal to a third disparity threshold.

3. The image processing device according to claim 2, wherein: the third disparity threshold is equal to a value obtained by dividing the first disparity threshold by a first value; the first value is a pixel ratio of the first resolution to the second resolution in a first direction; and the first direction is a pixel scanning direction when the first depth map and the second depth map are acquired.

4. The image processing device according to claim 3, wherein using the depths of the first portion of pixels on the first depth map and the depths of the second portion of pixels on the second depth map to generate the combined depth map further includes: maintaining the depths of the second portion of pixels on the second depth map; and on the second depth map, replacing the depths of the third portion of pixels with depths corresponding to values obtained by dividing disparities corresponding to the depths of the first portion of pixels by the first value.

5. The image processing device according to claim 1, wherein using the at least two first images to determine the first depth map corresponding to the at least two first images under the limit of the first disparity threshold further includes: performing a segmentation processing in each of the at least two first images to obtain segmented image blocks; grouping image blocks having same positions in the at least two first images to obtain a plurality of image block groups; determining a depth map of each image block group in the plurality of image block groups under the limit of the first disparity threshold; and joining depth maps of the plurality of image block groups together to generate the first depth map.

6. The image processing device according to claim 5, wherein performing the segmentation processing in each of the at least two first images further includes: performing the segmentation processing in each of the at least two first images according to a processing capability of a system.

7. The image processing device according to claim 1, wherein using the at least two first images to determine the first depth map corresponding to the at least two first images under the limit of the first disparity threshold further includes: determining a to-be-processed region on each of the at least two first images, respectively; and using to-be-processed regions of the at least two first images to determine the first depth map under the limit of the first disparity threshold.

8. The image processing device according to claim 7, wherein determining a to-be-processed region in each of the at least two first images further includes: determining a to-be-processed region according to a processing capability of a system.

9. The image processing device according to claim 7, wherein determining a to-be-processed region in each of the at least two first images respectively further includes: estimating an expected moving position of a movable object; and determining a to-be-processed region in each of the at least two first images according to the expected moving position of the movable object.

10. The image processing device according to claim 9, wherein determining a to-be-processed region in each of the at least two first images according to the expected moving position of the movable object further includes: taking the expected moving position as a center and determining a region matching the expected moving position on a first image according to a specified region size; and when the region matching the expected moving position exceeds the first image, modifying the region matching the expected moving position to obtain a to-be-processed region having the specified region size on the first image region.

11. The image processing device according to claim 9, wherein determining a to-be-processed region in each of the at least two first images according to the expected moving position of the movable object further includes: taking the expected moving position as a center and determining a region matching the expected moving position on a first image according to a specified region size; and when the region matching the movable position exceeds the first image, determining a region, within the region matching the expected moving position, that does not exceed the first image as a to-be-processed region.

12. The image processing device according to claim 10, wherein, before taking the expected moving position as the center and determining the region matching the expected moving position on a first image according to the specified region size, the operations further include:
   determining the specified region size according to a processing capability of a system.

13. The image processing device according to claim 9, wherein the at least two first images are captured by a photographing device on the movable object; and estimating the expected moving position of the movable object further includes: acquiring a current speed of a reference object in a photographing device coordinate system; and estimating the expected moving position according to the current speed of the reference object in the photographing device coordinate system.

14. The image processing device according to claim 13, wherein acquiring the current speed of the reference object in the photographing device coordinate system further includes: using a current moving speed of the movable object to estimate the current speed of the reference object in the photographing device coordinate system; or, using previously moved positions of the movable object to estimate the current speed of the reference object in the photographing device coordinate system.

15. The image processing device according to claim 6, wherein the processing capacity of the system is a maximum computing capacity of a computing unit of the system.

16. The image processing device according to claim 1, wherein the operations further include:
   acquiring at least two third images, the third images having the second resolution;
   using the at least two third images to determine a third depth map corresponding to the at least third images under the limit of the second disparity threshold; and
   avoiding obstacles by using the third depth map and the combined depth map.

17. The image processing device according to claim 1, wherein acquiring the at least two second images further includes: down-sampling the at least two first images to obtain the at least two second images.

18. The image processing device according to claim 1, wherein the operations further include:
   selecting an image group from a plurality of image groups according to a moving direction of the movable object, wherein the selected image group includes the at least two first images.

* * * * *